United States Patent [19]

Compton et al.

[11] Patent Number: 4,755,195
[45] Date of Patent: Jul. 5, 1988

[54] METHOD OF CONTINUOUSLY DEGASSIFYING WATER

[75] Inventors: Bruce J. Compton, Malius; Robert W. Giering, W. Bloomfield, both of N.Y.

[73] Assignee: Pennwalt Corporation, Philadelphia, Pa.

[21] Appl. No.: 42,616

[22] Filed: Apr. 16, 1987

Related U.S. Application Data

[63] Continuation of Ser. No. 797,330, Nov. 12, 1985, abandoned.

[51] Int. Cl.[4] ............................................. B01D 19/00
[52] U.S. Cl. ......................................... 55/53; 55/196; 261/117
[58] Field of Search ...................... 55/53, 196, 52, 191, 55/189, 185, 194; 261/117, 36.1

[56] References Cited

U.S. PATENT DOCUMENTS

| | | | |
|---|---|---|---|
| 957,849 | 5/1910 | Kalb | 261/117 |
| 2,357,445 | 9/1944 | Baker | 55/189 X |
| 3,070,935 | 1/1963 | DeLeon | 55/196 X |
| 3,131,117 | 4/1964 | Hickey | 55/189 X |
| 3,353,799 | 11/1967 | Lions et al. | 261/117 X |
| 3,628,758 | 11/1971 | Nichols | 55/53 X |
| 3,653,182 | 4/1972 | Welch | 55/53 |
| 3,723,065 | 3/1973 | Suryanarayana et al. | 261/117 X |
| 3,803,805 | 4/1974 | Low | 261/117 X |
| 3,946,534 | 3/1976 | Egly | 55/53 X |
| 4,017,276 | 4/1977 | Bloem | 55/53 X |
| 4,042,351 | 8/1977 | Anderson | 55/191 X |
| 4,229,417 | 10/1980 | Kanai et al. | 261/36.1 X |
| 4,322,226 | 3/1982 | Hudec | 55/189 X |
| 4,340,895 | 7/1982 | Kikuchi | 346/140 R |
| 4,370,151 | 1/1983 | Herbrechtsmeier et al. | 55/196 X |
| 4,371,434 | 2/1983 | Clarke | 55/185 X |
| 4,392,874 | 7/1983 | Yamauchi | 55/194 |
| 4,469,044 | 9/1984 | Bloom et al. | 118/410 X |

FOREIGN PATENT DOCUMENTS

| | | |
|---|---|---|
| 3308963 | 9/1984 | Fed. Rep. of Germany . |
| 2127711 | 4/1984 | United Kingdom . |
| 2132502 | 7/1984 | United Kingdom . |
| 782822 | 11/1980 | U.S.S.R. ............................ 55/196 |

OTHER PUBLICATIONS

Peter, G.; "The Physical Degassing of Water"; *Umweltschutz-Gesundheitstech*, vol. 62, pp. 204–207; 1982.

*Primary Examiner*—Richard L. Chiesa
*Attorney, Agent, or Firm*—Panitch Schwarze Jacobs and Nadel

[57] ABSTRACT

A method of continuously degassifying water includes the steps of continuously introducing helium gas into a vessel forming a substantially vertically disposed chamber therewithin at an upper portion thereof; continuously directing upwardly a spray of fine water droplets formed from undegassed water continuously introduced into said chamber at a lower portion thereof; permitting said fine water droplets to intimately contact said helium gas to displace gases contained in said water droplets to provide degassed water in accordance with Dalton's Law of Partial Pressures, said degassed water proceeding towards a bottommost portion of said chamber and vessel; and continuously directing said degassed water through an outlet at said bottommost portion of said vessel into a device desirous of using said continuous flow degassed water.

17 Claims, 1 Drawing Sheet

METHOD OF CONTINUOUSLY DEGASSIFYING WATER

This application is a continuation of application Ser. No. 06/797,330, filed Nov. 12, 1985, now abandoned.

STATEMENT OF THE INVENTION

This invention relates to apparatus and methods for degassing water in a continuous mode by an improved helium displacement technique.

BACKGROUND AND SUMMARY OF THE INVENTION

Helium degassing of water is well-known and routinely practiced in batch-type operations in many chemical laboratories. Small-scale or laboratory applications for the degassed water include its use in operating analytical equipment such as high performance liquid chromatographs, in electrochemical systems, pharmaceutical formulation dissolution testers, in clinical procedures, scientific determinations, and the like.

Most known apparatus and methods are directed towards batch-type operations, rather than continuous in view of serious problems encountered in the continuous degassification of liquids. More specifically, it is often difficult to insure that the continuously produced output effluent is substantially uniformly degassed within prescribed levels. Further, it is known that in batch-type operations, the stored degassed water for example oftentimes absorbs air as well as contaminants carried thereby unless special precautions are exercised.

Degassed water for use in larger scale applications include the processing and manufacturing of oxygen-sensitive compounds, and for injection (deoxygenated water) into structures in deep sea water in order to increase the extractable fraction of subsurface hydrocarbon resources therefrom, and the like. In the latter mentioned application, the substantially oxygen-free water to be injected reduces corrosion rates of affected metal parts and prevents the growth of aerobic bacteria which often impedes the flow of the extracted hydrocarbons from its source to the surface.

Other applications may require the removal of oxygen from the water, but not total degassing thereof. Such applications can readily benefit from the apparatus of the present invention. Nitrogen however will replace helium as the displacement gas; the apparatus then functions as a water deoxygenator rather than a water degasser.

Other methods of degassing water are known but suffer from certain disadvantages. For example:

Vacuum degassing of water is not readily compatible with a continuous operation.

Vacuum with stirring is not an efficient method of effecting mass transfer of the dissolved gases from within the water to its surface.

Sonification aids in the degassifying process by enhancing gas nucleation but fails to remove the nucleated gases.

Batch sparging with helium is effective in degassing water but, by definition, is not a continuous process and consequently requires storage facilities for the degassed water as mentioned above as well as an extended start-up period.

Degassing by heating water to boiling is effective and amenable to the continuous production of degassed water. The continuous boiling of water however is very expensive and potentially hazardous.

In the present invention, undegassed water is sprayed or "atomized" into a chamber wherein helium gas is continuously introduced. The gases dissolved in the water to be degassed are displaced by helium, which is not soluble in water, to provide the degassed water.

A more detailed description of the invention follows with reference to the accompanying drawings.

DETAILED DESCRIPTION OF THE INVENTION

Small-scale laboratory apparatus for producing about 1 to 2 liters/minute of degassed water is schematically represented at 10. The apparatus comprises a cylinder 12, suitably polypropylene or polyethylene, forming a chamber 14 therewithin. Cylinder 12 has an inlet 16 associated therewith for introducing helium gas thereinto at an upper portion thereof and another inlet 18 adjacent a lower portion for passage of undegassed water into chamber 14.

Figure 1:
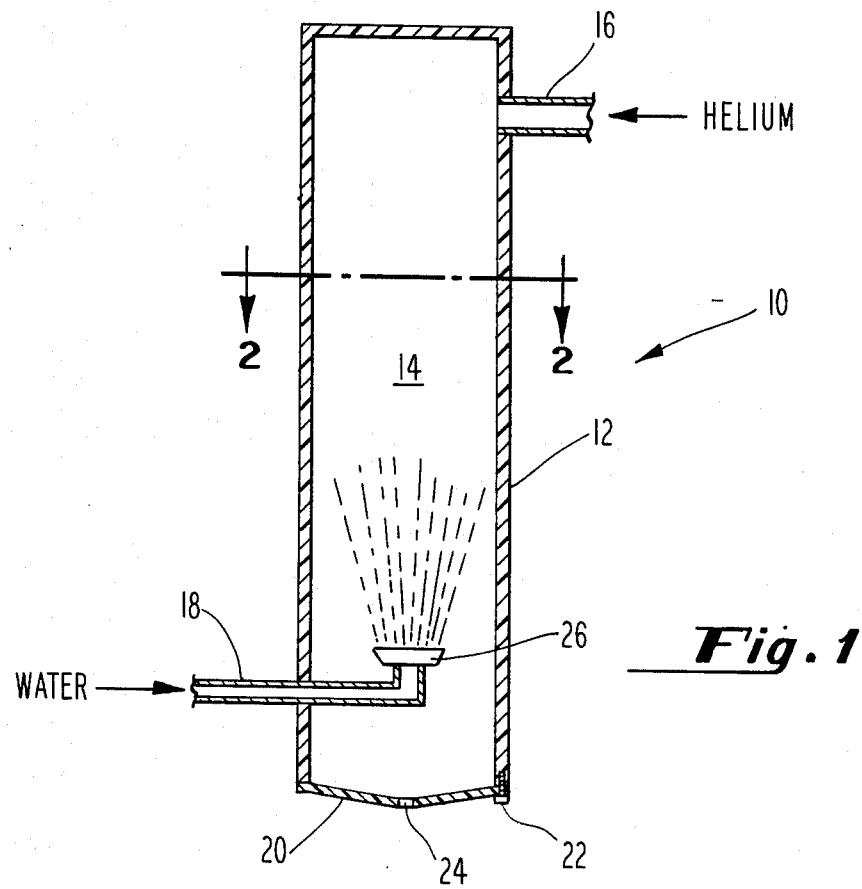
FIG. 1 is a sectional view illustrating schematically the apparatus of the present invention.
Figure 2:
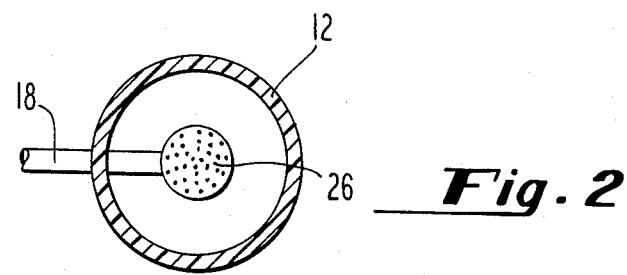
FIG. 2 is a view of the apparatus of FIG. 1 taken along line 2—2 thereof.

Cylinder 12 shown in FIGS. 1 and 2 of the drawings is approximately 24" high with a diameter of about 6". Cylinder 12 is provided with a bottom plate 20 removable therefrom by means of spaced screws 22. An outlet 24 or passageway is centrally disposed in bottom plate 20 for passage therethrough of degassed water and spent helium. Bottom plate 20 is shown formed with sides sloping towards outlet 24 but, of course, may merely comprise a flat plate.

A nebulizer 26 within chamber 14 is attached to the working end of water inlet 18. Nebulizer 26 comprises any suitable device which causes water from inlet 18 to form a spray or "atomized" droplets. Removal of plate 20 permits adjustment or changing of nebulizer 26 or cleaning of chamber 14.

Tubing (not shown) may readily be attached to outlet 24 for supplying the degassed water to laboratory dissolution testing equipment, for example, or for other suitable laboratory applications.

In operation, helium gas is introduced into helium inlet 16 to enter chamber 14 at a rate of flow ranging between about 2 to 10 liters per minute while simultaneously therewith, water enters water inlet 18 for spraying into a fine mist directed upwardly into chamber 14 by nebulizer 26 at the rate about 1.5 to 2.0 liters per minute. The helium, insoluble in water, contacts the fine water droplets to displace the gases contained therewithin in accordance with Dalton's Law of Partial Pressures.

Dispersion of the water into fine droplets increases the rate of its degassing by increasing the ratio of water surface area to water volume.

The rate of degassing of the water is further increased by the water spray being directed upwardly into chamber 14 to cause an increase in the residence time of intimate surface contact between the water mist droplets and the helium gas.

Since the cost of helium is modest, flow rates thereof approaching 10 L/min. may be resorted to in those instances where higher percentages of degassing is desired.

Nebulizer 26 should not be permitted to become covered with water to thereby prevent proper atomization. Thus, the helium flow rate should not fall below about 2 L/min. for a cylinder having the dimensions aforementioned and a water flow rate as above prescribed. Of course, different nebulizers may require different minimum helium flow rates, which rates are readily determinable by simple experimentation by one skilled in the art.

The effectiveness of the apparatus and methods of the present invention was compared with other methods of water degassifying discussed above by measuring the amount of dissolved oxygen in the degassed water. The present apparatus, when used in accordance with the methods described hereinabove, removed up to 80% of the dissolved oxygen and, by inference, dissolved gases.

TABLE I

Removal of Dissolved Oxygen by Various Methods

| Method | Oxygen Level (ppm) |
| --- | --- |
| No treatment | 8-9 |
| Vacuum, stirring | 4 |
| Vacuum, sonification | 3 |
| Batch helium sparging | 1-2 |
| Continous helium degassing by present method | 2 |

For larger scale operations, the evolved gases may be recycled by known means. If the degassing application requires the removal of oxygen, but not nitrogen, the displacement gas used will ideally be nitrogen rather than helium. Water thus produced will have been deoxygenated and the scrubbing process will involve the removal of oxygen from the sparge gases with the scrubbed nitrogen recycled. The scrubbing process may involve chemical removal of oxygen, cryogenic distillation, or membrane separation.

If the desired product is degassed water, helium will be used as the displacement gas, and the scrubbing process will remove nitrogen and oxygen. The scrubbing may involve cryogenic distillation or membrane separation of the gases.

Some of the advantages resulting from practicing the present invention include:

(1) The apparatus operates in the continuous mode and thus requires no water storage with possible contamination of the stored degassed water.

(2) The apparatus becomes operable immediately upon starting water and helium flow.

(3) The apparatus employs no mechanical moving parts and may be readily constructed without expensive machining of parts.

(4) The apparatus requires helium as the displacement gas which is modest in cost, at least in North America.

(5) The apparatus operates successfully at pressures which are safe, and requires no high temperatures or vacuums.

(6) The apparatus, due to its extreme simplicity, may be constructed of inert components to assure an absence of contamination therefrom.

We claim:

1. A method of continuously degassifying water comprising the steps of:

continuously introducing helium gas into a vessel forming a substantially vertically disposed chamber therewithin at an upper portion thereof, continuously directing upwardly a spray of fine water droplets formed from undegassed water continuously introduced into said chamber at a lower portion thereof, permitting said fine water droplets to intimately contact said helium gas to displace gases contained in said water droplets to provide degassed water in accordance with Dalton's Law of Partial Pressures, said degassed water proceeding towards a bottommost portion of said chamber and vessel, and continuously directing said degassed water through an outlet at said bottommost portion of said vessel into a device desirous of using said continuous flow of degassed water.

2. The method of claim 1 wherein the helium is introduced into the vessel at a rate of between about 2 to 10 liters per minute.

3. The method of claim 1 wherein at least about 80% of any oxygen dissolved in the undegassed water is displaced by the exposure to the helium gas.

4. The method of claim 1 wherein the step of continuously upwardly directing a spray of fine water droplets comprises the step of directing the undegassed water into the chamber through a nebulizer.

5. The method of claim 1 wherein the helium is introduced into the vessel at a rate at least about equal to a rate at which the undegassed water is introduced into the vessel.

6. The method of claim 5 wherein the vessel has a volume less than about 1 cubic foot.

7. The method of claim 5 wherein at least about 80% of any oxygen dissolved in the undegassed water is displaced by the exposure to the helium gas.

8. The method of claim 5 wherein the step of continuously upwardly directing a spray of fine water droplets comprises the step of directing the undegassed water into the chamber through a nebulizer.

9. The method of claim 5 wherein the rate at which the helium is introduced into the vessel is between about one and seven times the rate at which the undegassed water is introduced into the vessel.

10. The method of claim 9 wherein the vessel has a volume less than about 1 cubic foot.

11. The method of claim 9 wherein at least about 80% of any oxygen dissolved in the undegassed water is displaced by the exposure to the helium gas.

12. The method of claim 9 wherein the step of continuously upwardly directing a spray of fine water droplets comprises the step of directing the undegassed water into the chamber through a nebulizer.

13. The method of claim 1 wherein the undegassed water is introduced into the vessel at a rate of about 1.5 to 2.0 liters per minute.

14. The method of claim 13 wherein the helium is introduced into the vessel at a rate of between about 2 to 10 liters per minute.

15. The method of claim 14 wherein the vessel has a volume less than about 1 cubic foot.

16. The method of claim 14 wherein at least about 80% of any oxygen dissolved in the undegassed water is displaced by the exposure to the helium gas.

17. The method of claim 14 wherein the step of continuously upwardly directing a spray of fine water droplets comprises the step of directing the undegassed water into the chamber through a nebulizer.

* * * * *